United States Patent [19]

Taylor

[11] 4,107,998
[45] Aug. 22, 1978

[54] PETROL TANK GAUGES

[75] Inventor: Kenneth James Taylor, Pascoe Vale South, Australia

[73] Assignee: Stewart-Warner Corporation, Chicago, Ill.

[21] Appl. No.: 681,813

[22] Filed: Apr. 30, 1976

[30] Foreign Application Priority Data

Apr. 30, 1975 [AU] Australia .............................. PC1412
Mar. 29, 1976 [AU] Australia ............................. 12452/76

[51] Int. Cl.² .............................................. G01F 23/10
[52] U.S. Cl. .......................................... 73/313; 338/33
[58] Field of Search ............................. 73/313; 338/33

[56] References Cited

U.S. PATENT DOCUMENTS

| 2,551,793 | 5/1951 | De Giers et al. ....................... 73/313 |
| 2,624,821 | 1/1953 | McCandless ....................... 73/313 X |
| 2,716,685 | 8/1955 | Hastings ............................. 73/313 X |
| 2,923,156 | 2/1960 | Young ..................................... 73/313 |
| 3,432,790 | 3/1969 | Svilpe et al. ........................ 73/313 X |
| 3,482,200 | 12/1969 | Hamilton ............................ 73/313 X |
| 3,798,970 | 3/1974 | Schlanzky et al. ..................... 73/313 |
| 3,842,673 | 10/1974 | Riddel .................................. 73/313 |
| 3,925,747 | 12/1975 | Woodward et al. .............. 73/313 X |

FOREIGN PATENT DOCUMENTS 837,383 11/1938 France ....................................... 73/313
447,499 5/1936 Great Britain ............................. 73/313

Primary Examiner—Richard C. Queisser
Assistant Examiner—Joseph W. Roskos
Attorney, Agent, or Firm—Augustus G. Douvas; Allen Dillis V.

[57] ABSTRACT

A sender device for use in a system indicating liquid level including a pivotal contact member having sliding and overlapping contact with an evenly wound, straight resistance member providing an output that varies as a non-linear function of movement of the contact member.

8 Claims, 5 Drawing Figures

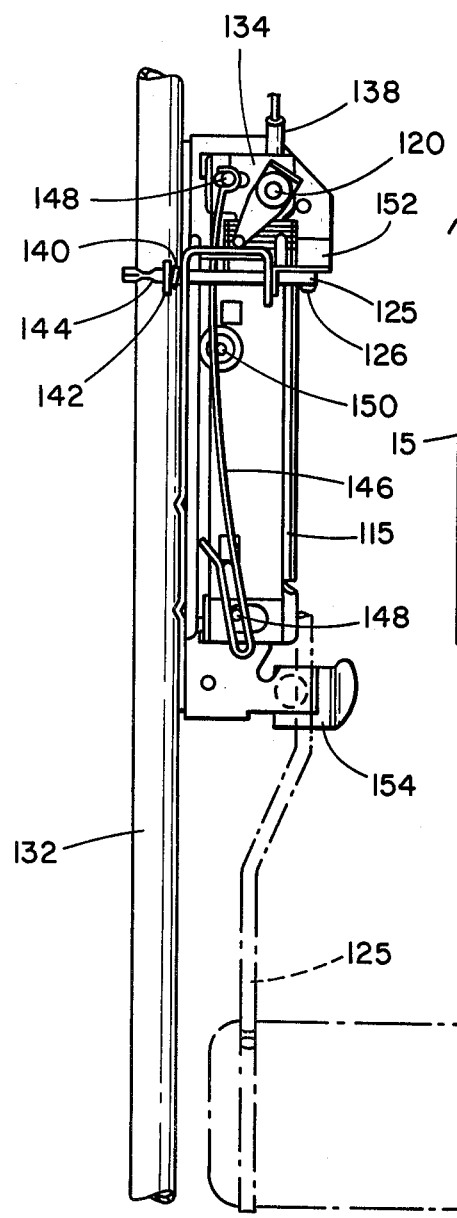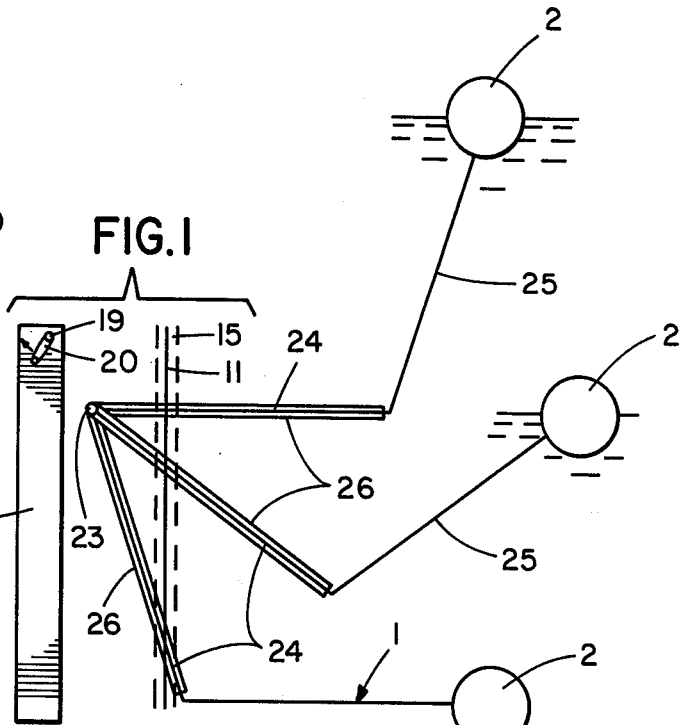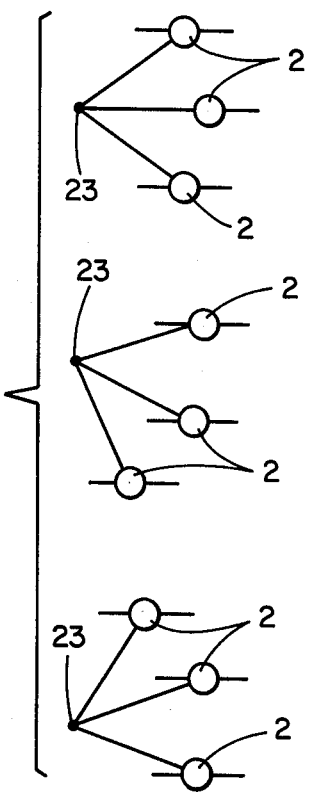

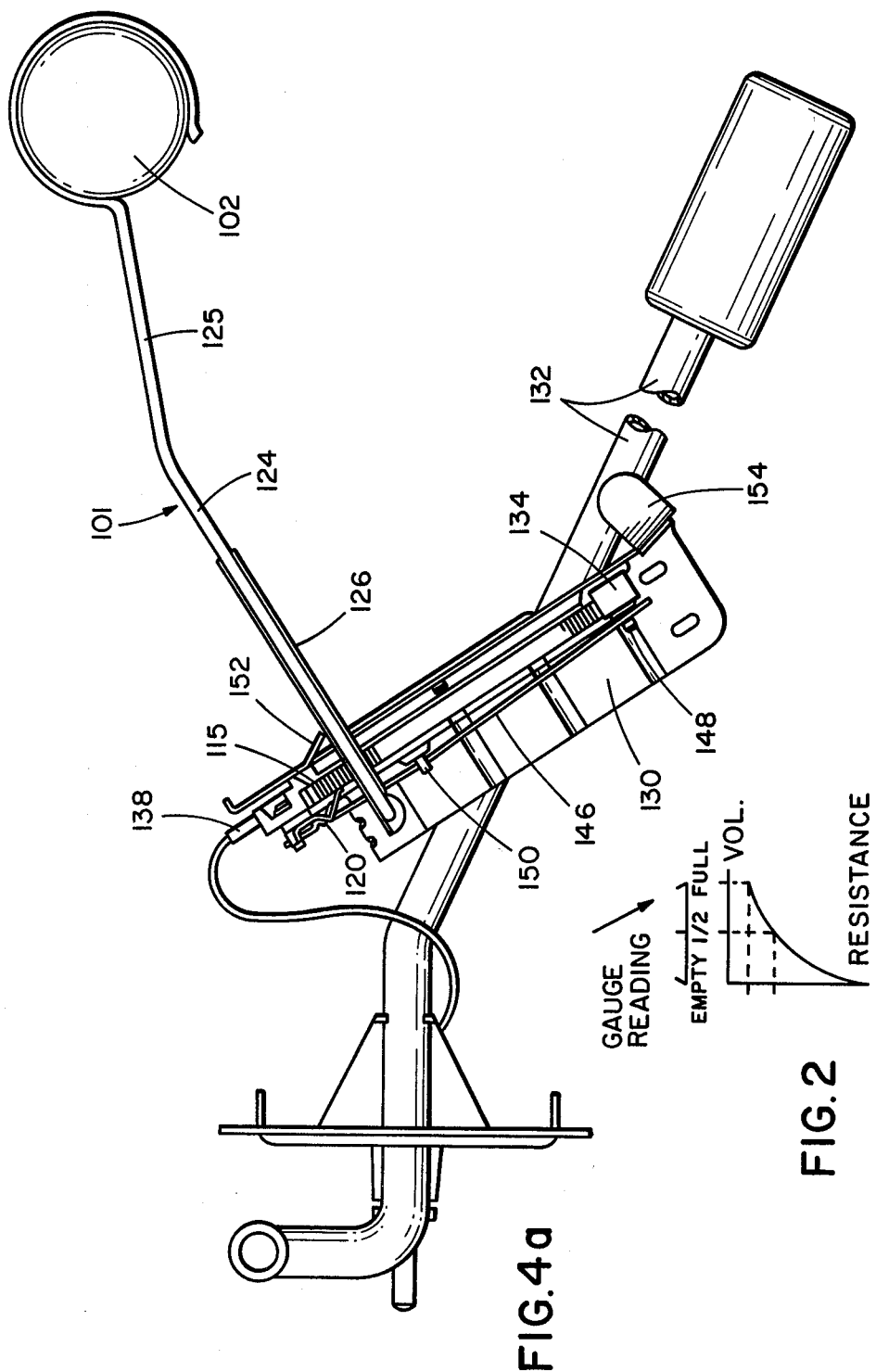

PETROL TANK GAUGES

BACKGROUND OF THE PRESENT INVENTION

This invention relates to a liquid level sensing device or "sender" or transmitter such as for indicating the amount or level of petrol or other liquid e.g. in a motor car fuel tank.

For this purpose it is known to use differential transformers and similar devices wherein a float moves an armature in a solenoid wired in circuit with a gauge responsive to changes of inductance in the solenoid. These so-called "magnetic" devices, although generally linear in nature, are quick to respond, which may often be a disadvantage when the level is subject to rapid temporary fluctuations due to bumping, rapid starts and stops, and other transitory irregularities in the motion of a vehicle in which it is incorporated.

Another known contrivance used a float cooperable with a rheostat to provide a variable current through a gauge, which may be of the so-called "thermal" type wherein the current heats a bi-metallic strip to which the gauge pointer is mechanically related in some suitable way. This has the advantage of a slow response and so tends to indicate an average level over an interval longer than a normal "sloshing" period, but it is generally non-linear in operation.

SUMMARY OF THE PRESENT INVENTION

An object of the invention is to provide an improved, accurate and reliable liquid level sender or transmitter cooperable with a known type of bi-metallic or other thermal type of indicator.

With this object in view, the invention in one form provides a sender device suitable for use in a system for indicating the amount or level of a liquid in a vessel by means of a "thermal"-type indicator or other slow-responsive meter which is non-linearly responsive to a sender current, the device including an elongate resistance member connectable to such indicator or meter, and a contact member associated with a float member, the contact member being movable along the resistance member with movement of the float member to provide a variable resistance which varies in accordance with a non-linear function with movement of the float member between first and second extreme positions.

The contact member may be connected to the float member by means of a curved or bent float arm pivotally mounted, at its end remote from the float member, at a position intermediate the ends of the resistance member. The contact member may be provided on an end portion of the float arm which extends transversely of the resistance member.

The resistance member may be a substantially linear wound rheostat shape to provide a contact edge extending therealong which is swept by the contact member in movement of the latter. The resistance member may be mounted such that it is spring loaded so as to be resiliently biased against the contact member, such as under a predetermined contact spring force.

The resistance member may be provided at one end portion thereof with an adjustable wiper arm whereby a minimum effective resistance, provided when the float member moves the contact member to a position adjacent that end portion, may be calibrated or adjusted to a desired resistance value.

In order that the invention may be more readily understood, description now will be directed to the accompanying drawings, in which:

FIG. 1 is a schematic representation of a sender device;

FIG. 2 illustrates the manner in which the resistance liquid lever function varies with operation of the device of FIG. 1;

FIG. 3 illustrates schematically variations possible in the form illustrated by the schematic representation of FIG. 1; and FIGS. 4a and 4b illustrate a construction in diagrammatic form of a sender device.

Referring more particularly to FIG. 1, float 2 is fixed to an arm 1 pivoted at 23 and comprising two mutually inclined connected portions 24 and 25. Portion 24 carries a contact member 26 adapted to slide in wiping contact relationship over a fixed rheostat 15 the windings of which are so formed as to present a substantially straight-line contact edge 11 to contact member 26, the edge being substantially at right angles to the pivot axis of float arm 1. Calibrating wiper 20 is pivoted near the end of rheostat 15 and contacts a penultimate portion of the resistance winding.

The resistance between terminal 19 (being the pivot point of 20) and wiper 26 is a non-linear function (conveniently, a simple trigonometrical function) of the level assumed by float 2, and the parameters of this function depend in part upon the setting of 20, the height of pivot point 23 with respect to the tank (FIG. 3), the distance between the contact edge of rheostat 15 and point 23, and the length and mutual inclination of portions 24, 25 of float arm 1. The relevant function for the arrangement of FIG. 2 approximates a tangent function. Rheostat 15 has a substantially linear resistance winding and when the tank is full, contact 26 crosses the rheostat's contact edge at approximately right angles. The "full position" effective resistance may be adjusted by moving wiper 20. The "half-full" resistance may be adjusted by bending or moving the rheostat such that its contact edge is closer to or further away from the pivot point. Reference to FIG. 1 will show that such adjustment would decrease or increase, respectively, the effective resistance. (It may be noted that at full position such adjustment of the rheostat will not sensibly alter the resistance because of the right-angle relationship referred to above.) The "empty" resistance may be adjusted by bending to the required position a metal stop or abutment on the rheostat frame.

FIG. 4 shows further details of a practical embodiment of the invention, in which parts corresponding to those designated in FIG. 1 are designated by the same reference numeral plus 100. The device consists of a pressed metal frame 130 upon which a rheostat 115 assembly is mounted in spring-loaded relationship against a float arm assembly 101; the frame being mounted on the upper portion of the fuel line 132 within the fuel tank (not shown).

The float arm assembly 101 comprises a wire arm looped at one end to hold a hollow float body 102, the other end being bent at right angles to form a pivot 123 receivable in coaxial holes in the frame. The contact member 126, here shown as being of U-section, is attached near this end of the float arm, and as the float rises and falls the contact rubs along the contact edge of the rheostat. This rubbing contact causes the effective resistance of the rheostat to change in accordance with the float level. The motion has a self-cleaning effect, and the geometry of the system results in a large area of contact for distribution of such wearing action as may eventuate.

The rheostat assembly comprises a plastics former 134 with a radiused contact edge. A resistance winding, advantageously of uniform pitch, terminates in V-grooves molded into the plastics former. The electrical contact to the resistance wire is made via a calibrating arm 120 and lead assembly 138 eyeleted on both sides of the plastics former, the eyelet being the intermediate current path. The calibrating arm 120 is just free enough to be moved for calibration purposes with a special tool, and the eye of the lead assembly is let into the plastic former such that it cannot be substantially moved and thus cannot substantially shift the calibrating arm setting.

The float arm assembly is spring-loaded axially along the pivot centre line by spring 140 and held by a flat retaining washer 142 retained by crimping the end of the float arm at 144.

The rheostat is biased laterally toward the contact 126 by means of contact spring 146; the ends of which pass over pins 148 of frame 130 and which intermediate its ends passes under pin 150 of former 134. The bias force provided by spring is sufficiently great to overcome the force of rheostat contact spring 146, thus pulling the contact in against the frame in permanent or substantially permanent contact with the frame, thus completing the earthing circuit. This contact rotates about the pivot point within a small friction radius also with a self-cleaning action. The surface of the frame on which the rheostat slides is advantageously such that it is possible to bend this surface, enabling the rheostat contact edge to be set closer to, or further from, the pivot centre line. The "full" and "empty" limit stops 152 and 154 for the float arm are also part of this same surface and can be bent independently to the required position. On another surface of the metal pressing nominally at right angles to the rheostat surface, welding projections are formed in a configuration that enables the frame to be spot welded on to a support member in any appropriate position as determined by fuel levels and the geometric requirement of the invention.

It will be evident from the foregoing that the liquid level sensing device of this invention is relatively simple in construction, is diversely adjustable for accommodation to tanks of different size and configuration, and is capable of providing a reliable indication of fuel level without being undesirably affected by such transient disturbances as are due to bumping, splashing etc.

Finally, it is to be understood that various alterations, modifications and/or additions may be introduced into the constructions and arrangements of parts previously described without departing from the spirit or ambit of the invention.

The claims defining the invention are as follows:

1. A sender device adapted for use in a system for indicating the amount or level of a liquid in a vessel with a meter which is non-linearly responsive to a sender current, comprising; substantially straight elongate resistance member adapted to be connected to an indicator, an elongated substantially straight contact member pivotally mounted about an axis closely spaced to said resistance member, said contact member being movable in overlapping relation and in sliding engagement with said resistance member to provide a resistance which varies in accordance with a non-linear function of contact member movement, said contact member being connected to a float member by means of a curved or bent float arm extending from the end of the contact member opposite the pivot axis of the contact member.

2. A sender device according to claim 1, wherein the contact member is provided on an end portion of the float arm extending transversely of the resistance member.

3. A sender device according to claim 1, wherein the resistance member is a substantially linear wound rheostat shape to provide a contact edge extending therealong which is swept by the contact member in movement of the latter.

4. A sender device according to claim 1 wherein the resistance member is mounted such that it is spring biased against the contact member.

5. A sender device adapted for use in a system for indicating the amount or level of a liquid in a vessel with a meter which is non-linearly responsive to a sender current, comprising; substantially straight elongate resistance member adapted to be connected to an indicator, an elongated substantially straight contact member pivotally mounted about an axis closely spaced to said resistance member, said contact member being movable in overlapping relation and in sliding engagement with said resistance member to provide a resistance which varies in accordance with a non-linear function of contact member movement, said resistance member being provided at one end portion thereof with an adjustable wiper arm to provide a minimum effective resistance.

6. A sender device adapted for use in a system for indicating the amount or level of a liquid in a vessel with a meter which is non-linearly responsive to a sender current, comprising; substantially straight elongate resistance member adapted to be connected to an indicator, an elongated substantially straight contact member pivotally mounted about an axis closely spaced to said resistance member, said contact member being movable in overlapping relation and in sliding engagement with said resistance member to provide a resistance which varies in accordance with a non-linear function of contact member movement, said resistance member being laterally movable or bendable intermediate its ends to permit calibration or adjustment of the effective resistance, provided when the contact member has an intermediate position, to a desired value.

7. A sender device for providing an output signal that is a non-linear function of liquid level, comprising; frame means, a substantially straight evenly would resistance element, a member pivotally mounted about an axis adjacent said resistance element, an elongated contact member carried by said pivotal member and having an elongated contact surface that extends across the resistance element whereby as the contact member pivots the contact surface both wipes and slides across the resistance element to provide a resistance that is a non-linear function of contact member movement, said contact member being connected to a float member by means of a curved or bent float arm extending from the end of the contact member opposite the pivot axis of the contact member.

8. A sender device as defined in claim 7, including a float member for moving said pivotal member, said resistance element being vertically mounted, said resistance element being spring biased into engagement with said contact member.

* * * * *